UNITED STATES PATENT OFFICE.

ADOLF VOIGT, OF SCHÖNBECK-ON-THE-ELBE, GERMANY.

PROCESS OF MANUFACTURING NITRATED CELLULOSE.

No. 860,776.   Specification of Letters Patent.   Patented July 23, 1907.

Application filed March 28, 1904. Serial No. 200,348.

*To all whom it may concern:*

Be it known that I, ADOLF VOIGT, a subject of the King of Prussia, German Emperor, and a resident of 7 Bahnhofstrasse, Schönbeck-on-the-Elbe, Kingdom of Prussia, German Empire, have invented a new and useful Process of Manufacturing Nitrated Cellulose, of which the following is an exact specification.

My invention relates to a new and improved process of manufacturing nitrated cellulose.
For manufacturing nitrated cellulose, as for instance gun-cotton or collodion wool the following process has been hitherto used. The scoured and dried cotton fibers are brought into a mixture of nitric acid and sulfuric acid. Thereafter the product is freed from the acid by means of a long and complicated boiling, washing and grinding process. The so obtained nitro cellulose has the structure of the raw fiber and must still be subjected to a diluting and gelatinizing process in order to make the nitro cellulose fit for the manufacture of a blasting material.

It has been tried to simplify the nitrating and pulverizing process for instance by combining both processes, so as to be carried out by one operation, or by effecting the pulverization before the nitrification. The latter trials have been made for the purpose of obtaining a highly nitrated product of a uniform composition. According to another process the cellulose has been dissolved in suitable liquids, then it has been decanted, washed and dried, whereafter the so-obtained powdered mass has been nitrated. In addition to being very complicated and expensive, this process has the disadvantage that a powdered material is very hard to nitrate and afterwards to wash out, and the stability of the nitro products so obtained is usually not sufficient in practice.
All the disadvantages above mentioned are overcome by the process forming the subject of the present invention, which process is carried out as follows: The scoured and cleaned cotton or cellulose is brought into concentrated sulfuric acid having a temperature of about 2° or 3° centigrade. Thereafter the material is stirred up, until it forms a pulpy mass. It has proved advantageous to use about 1 kg. of cellulose for 5 kg. of concentrated sulfuric acid. The disintegration of the fibers takes place very rapidly with a simultaneous increasing of the temperature. The operation is therefore advantageously carried out with a simultaneous cooling of the materials. After the structure has been destroyed, about 2 kg. of concentrated nitric acid are added, thereby converting the pulpy nitro-product into hard balls or lumps.
Also during the latter operations the materials are advantageously cooled. After about 2 or 3 hours the mass is congealed and forms a solid cake, which is washed out in great quantities of water, advantageously in a filtering press.

The obtained product after drying has the form of a very fine powder of a great stability. It does not explode by shocks or friction or by the blow of a hammer, even when upon an iron plate. When ignited it burns with a relatively small velocity. It can be exposed for more than one hour to a temperature of 135 degrees centigrade without igniting.

The material has proved very advantageous for the manufacture of shooting and blasting powders, of varnishes and the like.

Having thus fully described the nature of my invention, what I desire to secure by Letters Patent of the United States is:—

1. Process of manufacturing nitrated cellulose, consisting in introducing cellulose-fibers into concentrated sulfuric acid of a low temperature, leaving the same therein till the disintegration of the fibers has taken place, so as to form a pulpy mass, and then adding to this pulpy mass a sufficient quantity of concentrated nitric acid to form a nitrating mixture, whereby the disintegrated pulp is nitrated and converted into hard balls or lumps, and then washing the nitro-cellulose after being congealed in water.

2. Process of manufacturing nitrated cellulose, consisting in introducing cellulose-fibers into concentrated sulfuric acid of about 2 or 3 degrees centigrade, leaving the same therein till the disintegration of the fibers has taken place, so as to form a pulpy mass, and then adding to this pulpy mass a sufficient quantity of concentrated nitric acid to form a nitrating mixture, whereby the disintegrated pulp is nitrated and converted into hard balls or lumps, and then washing the nitro-cellulose after being congealed in water.

3. Process of manufacturing nitrated cellulose, consisting in introducing cellulose fibers into concentrated sulfuric acid of about 2 or 3 degrees centigrade, leaving the same therein, till the disintegration of the fibers has taken place; cooling the mass while the reaction takes place, so as to form a pulpy mass, and then adding to this pulpy mass a sufficient quantity of concentrated nitric acid to form a nitrating mixture, whereby the disintegrated pulp is nitrated and converted into hard balls or lumps, cooling the mixture while this reaction takes place, and then washing the nitro-cellulose after being congealed in water.

4. Process of manufacturing nitrated cellulose, consisting in introducing cellulose fibers into concentrated sulfuric acid of about 2 or 3 degrees centigrade, the ratio of these two substances being about 1 kg of cellulose to 5 kg of concentrated sulfuric acid, leaving the cellulose fibers in the sulfuric acid, till the disintegration of the fibers has taken place, then adding to this pulpy mass about 2 kg of concentrated nitric acid and then washing the nitro-cellulose after being congealed in water.

In testimony whereof I have signed my name to this specification in the presence of two subscribing witnesses.

ADOLF VOIGT.

Witnesses:
SARAH C. McKELLIP,
JAMES L. A. BURRELL.